(12) United States Patent
Jacobsen et al.

(10) Patent No.: US 6,966,132 B1
(45) Date of Patent: Nov. 22, 2005

(54) METHOD AND DEVICE FOR MOVING SUBSEA ROCKS AND SEDIMENTS

(75) Inventors: Tom Jacobsen, Trondheim (NO); Terje Fagervold, N-Tustna (NO); Gunner Fagervold, Lysoysundet (NO); Gustav Kvalvaag, Frei (NO)

(73) Assignee: GTO Subsea AS, Tustna (NO)

( * ) Notice: Subject to any disclaimer, the term of this patent is extended or adjusted under 35 U.S.C. 154(b) by 0 days.

(21) Appl. No.: 10/110,766

(22) PCT Filed: Oct. 30, 2000

(86) PCT No.: PCT/NO00/00359

§ 371 (c)(1),
(2), (4) Date: Jun. 25, 2002

(87) PCT Pub. No.: WO01/32503

PCT Pub. Date: May 10, 2001

(30) Foreign Application Priority Data

Nov. 3, 1999 (NO) .................................. 995362

(51) Int. Cl.[7] .............................. E02F 1/00; E02F 3/88
(52) U.S. Cl. ........................... 37/195; 37/321; 37/335; 15/409
(58) Field of Search .................... 37/195, 313, 314, 37/321, 320, 307, 322, 335; 299/8; 15/409, 15/322

(56) References Cited

U.S. PATENT DOCUMENTS

| | | | | |
|---|---|---|---|---|
| 147,780 A | * | 2/1874 | Milner ........................ 37/322 |
| 2,044,088 A | * | 6/1936 | Lord ......................... 417/151 |
| 2,125,740 A | * | 8/1938 | Schacht ..................... 37/322 |
| 2,135,148 A | * | 11/1938 | Roy ............................ 417/63 |
| 2,324,422 A | * | 7/1943 | Patterson .................... 15/409 |
| 3,010,232 A | * | 11/1961 | Skakel et al. ................ 37/195 |
| 3,448,691 A | * | 6/1969 | Frazier ....................... 417/189 |
| 3,495,409 A | * | 2/1970 | Riedemann ................. 405/286 |
| 3,672,725 A | * | 6/1972 | Johnson ........................ 299/8 |
| 3,877,238 A | * | 4/1975 | Chang et al. ............... 405/162 |
| 3,975,054 A | * | 8/1976 | Brockett et al. ............... 299/8 |
| 4,042,279 A | * | 8/1977 | Asakawa ....................... 299/8 |
| 4,070,061 A | * | 1/1978 | Obolensky .................... 299/8 |
| 4,087,981 A | * | 5/1978 | Norman ..................... 405/161 |
| 4,316,680 A | * | 2/1982 | Phipps et al. ................ 406/49 |
| 4,368,923 A | * | 1/1983 | Handa et al. .................. 299/8 |

(Continued)

FOREIGN PATENT DOCUMENTS

DE        19630297        1/1998

(Continued)

OTHER PUBLICATIONS

Land et al, "Ukooa Drill Cuttings Initiative" CEFAS Dredging Research Ltd., Jan. 2000.

(Continued)

*Primary Examiner*—Thomas B. Will
*Assistant Examiner*—Thomas A Beach
(74) *Attorney, Agent, or Firm*—Dennison, Schultz, Dougherty & MacDonald

(57) ABSTRACT

A method for moving subsea rocks and sediments which can be at significant depths, in connection with removal of protective rocks around installations where maintenance is to be conducted. Tubing with an ejector nozzle is arranged completely externally in relation to the tubing on a standard, remote controlled submarine (ROV), so that the ejector nozzle produces a pressure gradient through the tubing. An inlet end of the tubing is located with the rocks and sediments to be moved, which are sucked into the tubing and blown out of the opposite end of the tubing.

8 Claims, 1 Drawing Sheet

U.S. PATENT DOCUMENTS

| | | | |
|---|---|---|---|
| 4,479,741 A | | 10/1984 | Berti et al. |
| 4,681,372 A | | 7/1987 | McClure |
| 4,718,835 A | * | 1/1988 | Maruyama .................. 417/171 |
| 4,779,404 A | * | 10/1988 | Bell ................................. 56/9 |
| 4,822,106 A | * | 4/1989 | Wilson et al. .................. 299/9 |
| 5,425,599 A | * | 6/1995 | Hall et al. ................... 405/158 |
| 5,452,528 A | * | 9/1995 | Theurer et al. ............... 37/104 |
| 5,555,941 A | * | 9/1996 | Theurer et al. ............... 171/16 |
| 5,659,983 A | * | 8/1997 | Coutarel et al. ........... 37/142.5 |
| 6,145,223 A | | 11/2000 | Flesen |
| 6,178,670 B1 | * | 1/2001 | Susman et al. ............... 37/313 |
| 6,237,259 B1 | * | 5/2001 | Myers, II .................... 37/315 |
| 2003/0121182 A1 | * | 7/2003 | Jacobsen et al. .............. 37/195 |

FOREIGN PATENT DOCUMENTS

| | | | |
|---|---|---|---|
| EP | 091264 | | 10/1983 |
| EP | 0178873 | * | 4/1986 |
| GB | 1598776 | | 9/1981 |
| JP | 54-42682 | * | 12/1979 |
| JP | 1-219220 | * | 1/1989 |
| JP | 4-128422 | * | 4/1992 |
| JP | 4-325800 | | 11/1992 |

OTHER PUBLICATIONS

Operator's Manual, "Tritech ZipJet-Ultra" Tritech International Ltd.

Pump Tech AS, "Dredging Equipment", Feb. 2003, w/English translation.

* cited by examiner

METHOD AND DEVICE FOR MOVING SUBSEA ROCKS AND SEDIMENTS

BACKGROUND OF THE INVENTION

For work at subsea oil and gas installations or in connection with such installations, e.g. maintenance work, there is often a need to move rocks and particulate material that partly covers the body that is to be repaired. The body can be a pipeline, valve housing and the like.

In a similar way it may arise a need to remove sediments in connection with new installations on the sea bottom, or for removal of accumulated drill cuttings at platforms or the like.

Similar needs may also occur in connection with subsea work, such as at harbour works or barrage or quay structures.

DESCRIPTION OF RELATED ART

The most common way to remove sediments in connection with subsea work, is to utilize large "fans", large and heavy suction devices with a high power consumption and specially designed excavators. Disadvantages are that they require a lot of power and/or other resources, they require large surface vessels, have a limited versatility, are as good as stationary, or they are not at all suited for deep waters.

NO patent No. 302.043 describes a dredge designed for subsea operations, especially to remove or move drill cuttings. The dredge comprises a motor, a pump device and an ejector. The motor is designed to run the pump which in its turn provides a stream of water to the ejector. The ejector is positioned in a tubing through which the cuttings or the like are supposed to be transported. The apparatus is designed to rest on the sea bottom and to receive energy from the surface, while the inlet end of the tubing is intended to be moveable e.g. with the aid of a remote controlled mini submarine, a so called ROV.

This apparatus is not suited to move sediments with relatively large rocks, mainly because the pipeline has an effective loss of diameter due to the ejector's design and position. Furthermore it has geographically a very limited work range, as it is designed to rest at the sea bottom, even though the pipeline is supposed to be somewhat moveable.

Japanese patent applications Nos. 043 25 799 A and 043 25 800 A describes an ejector pump system where the ejector is positioned mainly outside the pipeline so that the ejector does not reduce the effective diameter of the pipeline. From the abstract of these patent applications it is not possible to see what kind of utilizations these systems are intended for. Neither are there any indications of dimensions or power requirements for these systems.

SUMMARY OF THE INVENTION

It is an object of the present invention to provide a method for transportation of rocks and sediments under water, especially in deep waters.

It is a particular object to provide a method for transportation of rocks with a typical maximum diameter of about 200 mm.

It is further an object to provide an apparatus for performing said method, which apparatus should be versatile in its use, especially in the way that it should be easy to move around down at the sea bottom.

It is still further an object to provide such an apparatus which is easy to control, and which does not require large amounts of energy to be supplied from the surface, but which can utilize the standard power supply available on an ROV.

BRIEF DESCRIPTION OF THE DRAWINGS

In the following an example of an apparatus according to the invention is described in further detail with reference to the accompanying drawing.

DESCRIPTION OF THE PREFERRED EMBODIMENTS

Figure 1:
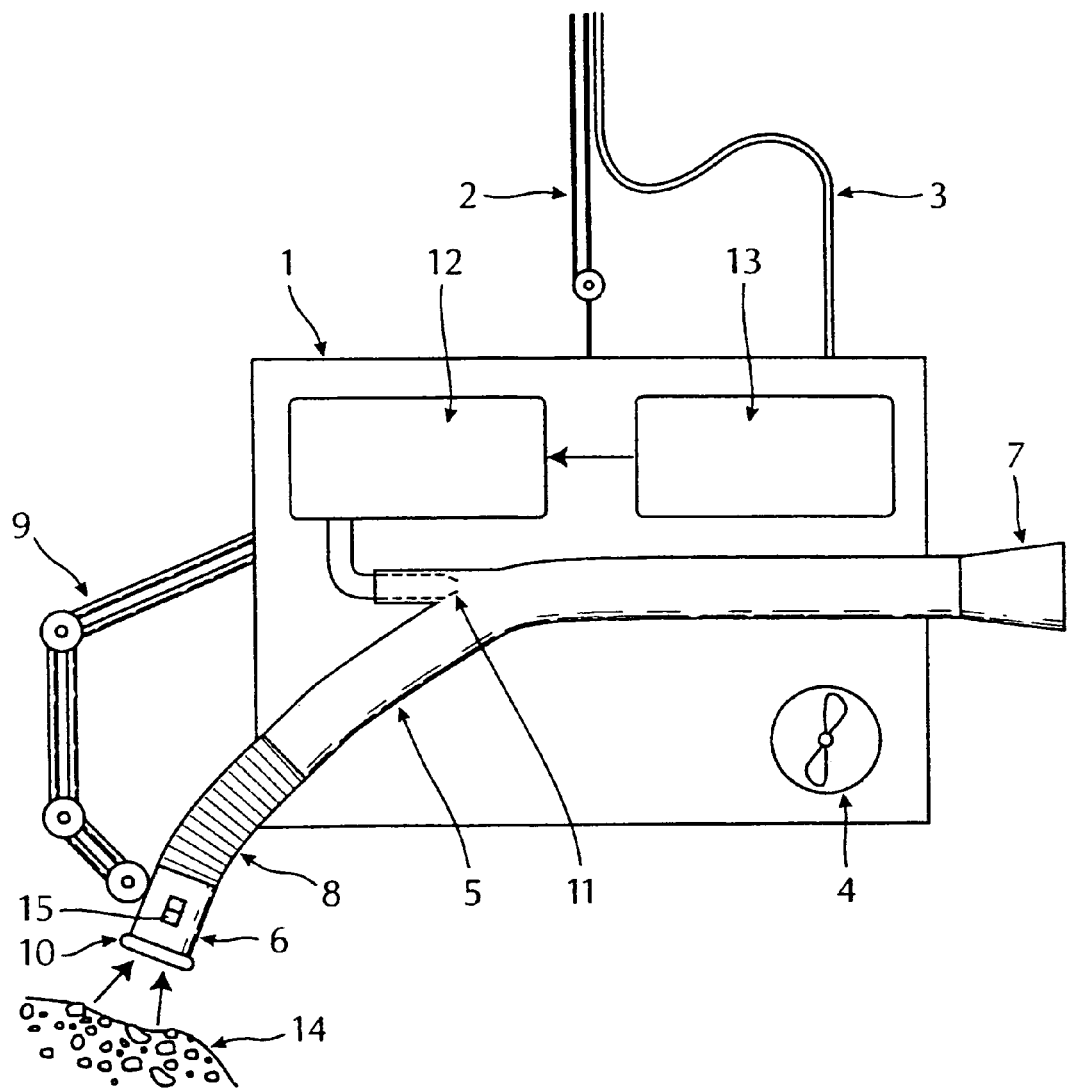
FIG. 1 is a schematic view of a preferred embodiment of an apparatus according to the invention.

FIG. 1 shows in a very simplified form a remote controlled submarine (ROV) 1 with a suspension member 2 and a power cord 3. The suspension member 2 and the power cord 3 both extend up to the sea surface (not shown). The ROV 1 is also provided with a number of propellers 4 to enable it to move, one of which is shown in the drawing.

Arranged on the ROV 1 is a tubing 5 with an inlet 6 and an outlet 7. The tubing 5 may have at least one flexible section 8, permitting the inlet 6 of the tubing to be moved by means of a manipulator 9 that can be controlled independently of the ROV. The edge 10 of the inlet 6 is rounded to minimize loss at the inlet. The outlet 7 is shaped as a diffusor, also to minimize loss and thereby the power requirement. The tubing 5 is preferably designed with a substantially even cross section from its inlet to its outlet and without any sharp bends where large rocks might be trapped.

An ejector nozzle 11 is attached externally to the tubing 5 so that it does not diminish the diameter of the tubing. The ejector nozzle 11 provides a powerful water jet supplied from a water pump 12 powered by a hydraulic member 13. The ejector nozzle 11, the water pump 12 and the hydraulic member 13 together constitute the power assembly or the "motor" for the apparatus according to the invention.

Close to the inlet 6 of the tubing a "backflushing" arrangement may preferably be arranged to blow out rocks which are too large or clogged sediment that might get stuck in the inlet. Further an opening 15 may be provided through the inlet 6 or through the tubing 5 close to the inlet, the size of which is preferably adjustable for the purpose of controlling the suction at the inlet point and reducing its tendency to get stuck in fine sediments.

The apparatus according to the invention may be primarily manufactured from plastic material with a specific weight close to that of water, so that it is easy for an ROV to carry.

All the mentioned units are fixed or moveable on the ROV 1 and the power consuming components all receive power through the ROV's standard power supply 3.

The drawing also indicates a collection of rocks 14 in the process of being moved through the tubing 5 by means of the described mechanism.

Calculation Example

In the following calculation example it is presupposed that the apparatus is attached to a ROV with an available 30 kW (hydraulic) effect. It is further presupposed that the hydraulic motor and the water pump have a total efficiency of 0.64. In that case the water pump will be able to provide 3000 l/min. at a pressure of 4.0 bar. Rocks used to protect structures at the sea bottom usually have a largest diameter $d_{max}$=150 mm. If the tubing has a diameter of 250 mm and a length of 8.0 m, the following theoretical data follows:

TABLE 1

| | |
|---|---|
| Velocity before mixing chamber | 5.0 m/s |
| Velocity after mixing chamber | 6.0 m/s |
| Required velocity | 4.0 m/s |
| Motive power (lifting height) | 1.50 m |
| of which | |
| inlet loss | 0.26 m (k = 0.2) |
| frictional loss | 0.68 m (k = 0.017) |
| outlet loss | 0.56 m (k = 0.3) |
| Capacity transport of 150 mm rocks | 20 t/hour |
| | (confirmed by model tests) |
| Power consumption ROV | 30 kW |
| Power from water pump | 19 kW |
| Net effect used by the device | 4 kW |

Example of Practical Embodiment

In a commission during the summer of 1999 1500 m³ of rocks ($d_{max}$=150 m) were moved with an apparatus according to the present invention. The commission took place in Tengsfjorden, at a pipeline for oil at a 540 m depth. An ROV of type Perry-XL was used. 100 l/min. of hydraulic oil at a pressure of 180 bar was available for running the water pump, which corresponds to 29 kW. The tubing, made from PE-plastic, had a total length of 10 m, and an internal diameter of 250 mm. Only a minimal wear could be observed on the tubing, It was observed, however, that rocks from time to time got stuck due to unintended unevenness in the tubing. The invention is unique in the sense that it allows rocks to be moved with much lighter equipment than that previously available on the market, and at depths where it has not been possible to conduct this kind of task. The above-referred commission confirms that the invention is practically feasible.

What is claimed is:

1. Method for moving subsea rocks and sediments, comprising disposing, in combination with a remote controlled submarine (ROV) having propulsion means, a tubing having a substantially constant cross section and a first end adjacent the ROV and a second end adjacent the ROV, a controllable aperture to control suction force in said first end, a water pump, an ejector nozzle connected to the water pump for expelling a stream of water in a direction toward the second end of the tubing, the ejector nozzle being disposed externally to the tubing, moving the first end of the tubing to contact the subsea rocks and sediments to be moved, and establishing a controlled pressure gradient through the tubing by moved expelling the stream of water toward the second end of the tubing, whereby the rocks and sediment are expelled through the second end of the tubing.

2. Method according to claim 1, wherein water pump is supplied with energy by the energy supply of said ROV.

3. Device for moving subsea rocks and sediments, comprising a remote controlled submarine (ROV) including propulsion means, and including in combination therewith, tubing having a substantially constant cross section and a first end constructed and arranged for contacting the rocks and sediment to be moved and a second end constructed and arranged for expelling the rocks and sediment to be moved away from the ROV, a controllable aperture for controlling suction force in said first end, and means for creating a pressure gradient in the tubing comprising a water pump connected to an ejector nozzle for expelling water toward the second end of the tubing, the ejector nozzle being disposed externally to the tubing.

4. Device according to claim 3, wherein all required energy is supplied through at least one cable from the surface to the ROV.

5. Device according to claim 3, wherein the first end of the tubing is movable by means attachable to the ROV.

6. Device according to claim 3, wherein an inlet mouth piece attached to the first end of the tubing comprises a rounded edge in order to reduce inlet loss.

7. Device according to claim 3, wherein the second end of the tubing comprises an outlet shaped as a diffusor in order to reduce outlet loss.

8. Device according to claim 3, comprising parts thereof made from plastic materials with a density close to the density of water, to enable easy support by an ROV.

* * * * *